Jan. 18, 1966  V. E. MUTTI ETAL  3,230,014
AUTOMATIC TAIL GATE OPENING MEANS FOR TRUCKS
Filed May 27, 1964  2 Sheets-Sheet 1
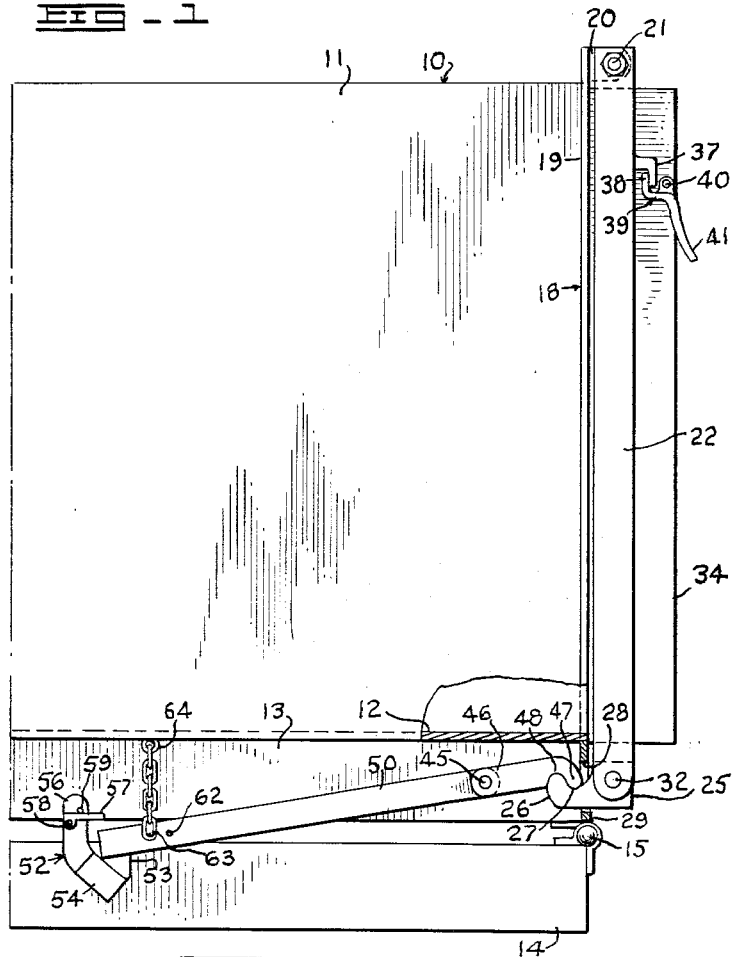
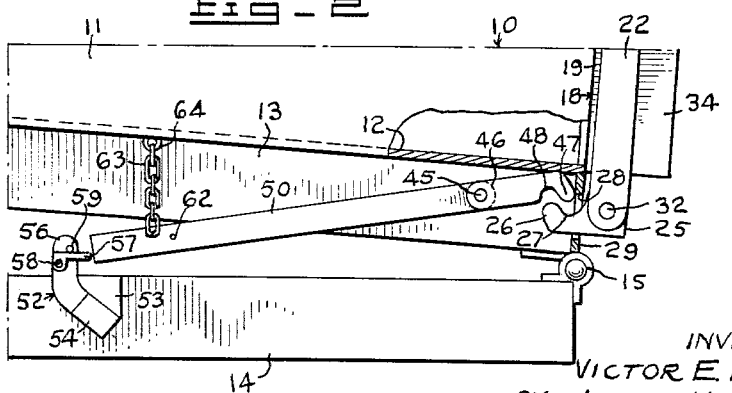
INVENTORS
VICTOR E. MUTTI
BY JOSEPH VENDOLA
John V. Phillips
ATTORNEY

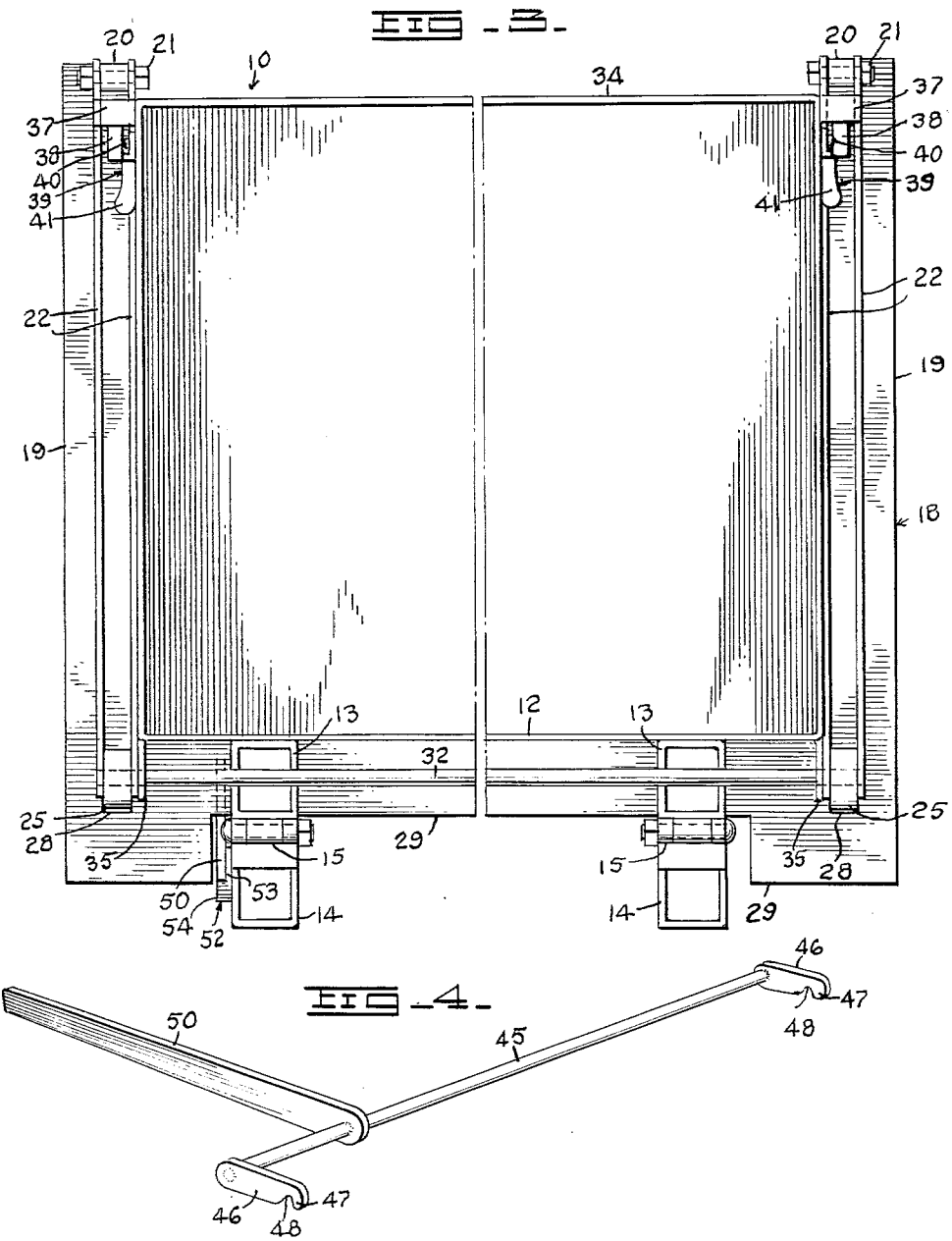

United States Patent Office 3,230,014
Patented Jan. 18, 1966

3,230,014
AUTOMATIC TAIL GATE OPENING MEANS FOR TRUCKS
Victor E. Mutti, 309 Shumaker Drive, and Joseph Vendola, P.O. Box 122, both of Bremen, Ind.
Filed May 27, 1964, Ser. No. 370,491
7 Claims. (Cl. 298—23)

This invention relates to tail gates for trucks and is a continuation-in-part of our application Serial No. 259,293, filed February 18, 1963, now abandoned.

In our earlier application referred to, we have disclosed a tail gate for trucks wherein the tail gate assembly is permanently secured to the truck body so that it cannot possibly be lost, yet the tail gate unit is adapted to be opened either at the top or bottom, as may be desired. In the earlier construction, manually operable means is provided for releasing the bottom of the tail gate to swing outwardly when it is desired to dump material from the truck.

An important object of the present invention is to improve the earlier construction by providing automatic means for releasing the bottom of the tail gate when the truck body is elevated to dumping position, thus making it wholly unnecessary to operate any manual means for performing this function.

A further object is to provide automatic means for locking the bottom of the tail gate in closed position when the body is lowered to its normal horizontal position.

A further object is to provide novel means, including a cam, for operating one of two complementary locking means for the bottom of the tail gate when the truck is lowered to normal horizontal position.

A further object is to provide such a device including a lever connected to said one complementary member and engageable with said cam, and to provide means automatically engageable with the lever, for moving said one complementary member positively to unlocked position to release the bottom of the tail gate when the truck body has its forward end elevated for the dumping of material from the truck.

A further object is to provide a combination of elements of such nature that any bulk load on the truck that will create a stress on the tail gate cannot cause the upper latching means to give way since most of the stress is transmitted directly to the truck body.

Other objects and advantages of the invention will become apparent during the course of the following description.

In the drawings we have shown one embodiment of this invention. In this showing

FIGURE 1 is a side elevation of a portion of a dump truck body and a portion of the chassis frame therebeneath;

FIGURE 2 is a fragmentary side elevation of the bottom rear portion of the same elements showing the truck body being moved toward dumping position;

FIGURE 3 is a rear elevation of the truck, parts being broken away;

FIGURE 4 is a perspective view of the lock shaft and associated elements, and

FIGURE 5 is a detail perspective view of the lever locking and releasing means carried by the chassis frame.

Referring to FIGURES 1 and 2, the numeral 10 designates the body of a truck as a whole having side walls 11 and a bed 12, the rear end of which is open and is normally closed by a tail gate structure to be described. The bed of the truck body is secured to body frame members 13 spaced apart and extending longitudinally of the body, and these frame members are arranged above correspondingly arranged chassis frame members 14. The frame members 13 and 14 are pivotally connected as at 15 whereby the forward end of the truck body may be elevated to a dumping position. Any suitable means may be employed for moving the truck body to dumping position.

A heavy steel plate 18 of substantially U-shape has side arm portions welded to the sides 11 of the truck body. These side arm portions, indicated by the numeral 19, respectively carry ears 20 and a bolt 21 extends through each ear to pivotally connect thereto a pair of parallel links 22. A locking block 25 is welded between the links 22 at each side of the truck. Each block 25 is provided with a forwardly extending lock finger 26 having a recess 27 opening upwardly, for a purpose to be described. Each finger 26 projects through an opening 28 formed in the horizontal bottom portion 29 of the U-shaped plate 18.

A pivot shaft 32 extends through the lower ends of the links 22 and entirely across the width of the truck as shown in FIGURE 3. Stub shafts may be used at either side of the truck body instead of a solid shaft 32, but the latter is preferred to act as a tie rod.

A tail gate unit 34 is arranged between the pairs of links 22 as shown in FIGURE 3 and is provided adjacent the inner link of each pair with a depending finger 35 pivoted on the shaft 32. Thus the tail gate unit 34, when the upper end thereof is released in a manner to be described, is adapted to swing outwardly from the truck body at the top thereof.

The rear edges of the links 22 of each pair have preferably welded thereto a depending lock finger 37 engaged by the finger 38 of a latch 39 pivoted as at 40 to each side of the tail gate unit and provided with an operating handle 41. The latches 39 normally lock the top of the tail gate unit in closed position, as will be apparent.

Forwardly of the fingers 26, a transverse shaft 45 is journaled in the body frame members 13 and each end of this shaft carries lock members 46 (FIGURE 4) provided at their rear ends with fingers 47 engageable in one of the recesses 27. The forward end of each finger 26 is engageable in a recess 48 formed in the associated lock member 46. The lock members 46 are fixed to the shaft 45. Also fixed to such shaft adjacent the plane of the outer vertical face of one of the frame members 14 is a lever arm 50 (FIGURE 4) sloping downwardly and forwardly at an angle as shown in FIGURE 1.

A lever control unit 52 is provided with an inner plate portion 53 (FIGURE 5) welded to the outer vertical face of the frame member 14 referred to. Integral with the plate 53 is a cam block 54 engageable with the free end of the lever arm 50 when the parts are in their normal positions shown in FIGURE 1. The plate 53 is provided with an upwardly extending end 56 overlying the adjacent side of the adjacent body frame member 13, and a finger 57 is pivoted to the end 56 as at 58. A manually removable pin 59 has one end fixed to the end 56 and overlies the finger 57 to normally prevent upward movement thereof, for a purpose to be described.

Ordinarily, the lower end of the tail gate structure swings outwardly from the truck body about the common axis of the bolts 21. Now and then, it is desired to swing the upper end of the tail gate unit 34 downwardly about the axis of the shaft 32. Under such conditions, it is desirable to hold the lever arm 50 against downward movement with the finger 57 swung out of its path of travel. In order to prevent relative downward movement of the lever arm 50, the latter is provided with a pin 62 engageable in the lowermost link of a chain 63, the upper end of which engages a ring 64 welded to the bed 12 of the truck. It will become apparent that the chain 63 is normally inoperative.

*Operation*

The parts normally occupy the position shown in FIGURE 1. Assuming the truck body to be loaded with material which is to be dumped, the forward end of the truck body will be elevated by conventional means employed for this purpose. The rear end of the truck body pivots at 15, and the lever arm 50 moves upwardly with the shaft 45 (the latter moving arcuately about the axis of the pivot 15) and the free extremity of the lever arm will be relieved from engagement with the cam block 54. Normally, the locking fingers 26 and 47 will stick in engagement with each other so that the lever arm 50 will not drop by gravity. Under such conditions, the free end of the lever arm will engage the finger 57 which acts to positively turn the lever arm 50 and locking members 46 a sufficient distance in a counter-clockwise direction to disengage the fingers 26 and 47. The material in the truck and the force of gravity acting on the tail gate structure tend to maintain it vertical will cause the tail gate structure to swing outwardly at its lower end, and accordingly the material may be dumped from the truck.

When the preceding operation is carried out, the free extremity of the lever 50, moved downwardly by the finger 57, will occupy a position in which the extremity of the finger 57 is out of the path of travel of the extremity of the lever. The lever will be held in such position by the friction of the parts or by engagement of the upper right-hand portions of the locking members 46 against the truck bed 12. After the dumping operation, the forward end of the truck body is lowered and the free extremity of the lever 50 will clear the finger 57. Just before the truck body reaches horizontal position, the tail gate assembly will have moved to its normal closed position by gravity, the center of gravity of the tail gate structure lying rearwardly of the vertical plane of the common axis of the bolts 21. This normal position of the tail gate structure will be reached just prior to engagement of the free end of the lever arm 50 with the cam block 54, and accordingly, the recesses 27 will be in a position to receive the fingers 47. Engagement of the free end of the lever arm 50 with the cam block moves the lever arm 50 upwardly, rocking the locking members in a clockwise direction to tightly engage the fingers 47 back of the fingers 26. The structure of these locking fingers is such that the tail gate structure will be cammed tightly to closed position.

It will therefore be apparent that movement of the truck body to dumping position automatically releases the means for locking the lower end of the tail gate structure in position, and the finger 57 positively swings the locking fingers 47 upwardly to inoperative positions so that the tail gate structure is free to swing outwardly about the common axis of the bolts 21 to dump the material in the truck. It will be apparent that the closing of the tail gate structure is also automatic and that the cam block 54 acts to positively lock the fingers 26 and 47 with respect to each other. The free end of the lever arm 50 remains in tight engagement with the cam block 54, and accordingly, it is impossible for the locking means for the bottom of the tail gate structure to unlock until the truck body is again moved to unload it.

It will be apparent therefore that the foregoing operations of locking and unlocking the bottom of the tail gate structure are fully automatic, it being wholly unnecessary to provide manually operable means, controlled from the cab of the vehicle or from the side or rear or the truck, for locking and unlocking the bottom of the tail gate structure. The mechanism thus provides a safety operation, it being impossible for the vehicle driver or workman to be injured in manually controlling the operations described. Moreover, to dump the truck, it is unnecessary for the driver to leave the cab of the vehicle, and expensive cab-control means for accomplishing the functions referred to are eliminated.

On relatively rare occasions, for example, for some loading operations, it is desirable to swing the top of the tail gate unit outwardly and downwardly about the axis of the shaft 32. When this operation is to be performed, the pin 59 will be removed and the finger 57 swung upwardly and to the left to an inoperative position out of the path of travel of the adjacent end of the lever arm 50. The lowermost link of the chain 63 will be engaged with the pin 62, thus preventing the swinging of the lever arm 50. The fingers 26 and 47 thus will be retained in locking engagement, regardless of the tilting of the truck body. An operator then may move the handles 41 to release the latches 39 from the fingers 37, whereupon the tail gate unit is free to swing outwardly and downwardly at its upper end. It will be noted that the latches 39 and fingers 37 are arranged close to the top of the tail gate structure. Stresses applied against the tail gate by material in the truck body, when the latter is heavily loaded, will be transmitted to the links 22 close to the bolts 21, and the pressure of the material is thus divided between the bolts 21 and the lockings fingers 26 and 47.

It is to be understood that the form of the invention shown and described is to be taken as a preferred example of the same, and that various changes in the shape, size and arrangement of the parts may be made as do not depart from the spirit of the invention or the scope of the appended claims.

We claim:

1. For a dump truck having a body provided with an open rear end, a bed and a chassis frame, a tail gate assembly for such end of the truck body pivoted at its upper end to the top of said truck body, a locking element fixed to said tail gate assembly adjacent each side and near the bottom thereof and projecting forwardly beneath said tail gate assembly and beneath said bed, a locking device carried by the truck body at each side thereof and engageable with the respective locking elements to lock them in position, a lever fixed with respect to said locking devices, means carried by the chassis frame and engageable with said lever when the truck body is lowered to normal position from a dumping position for positively moving each locking device into operative engagement with its associated locking element, a supporting frame for said truck body therebeneath, a transverse rock shaft carried by said supporting frame and by which said locking devices are carried, said lever being elongated and fixed to said shaft outwardly of one side of said supporting frame and extending a substantial distance forwardly and terminating in a free end engageable with said means.

2. A structure according to claim 1 provided with means carried by said chassis frame and engageable with said lever to move it when said truck body is moved from a normal position to a dumping position for positively releasing said locking devices from said locking elements.

3. For a dump truck having a body provided with an open rear end and a chassis frame, a tail gate assembly for such end of the truck body comprising normally vertical side elements pivotally connected at their upper ends to the truck body, a cross shaft connected between said side elements adjacent the lower ends thereof, and a tail gate unit pivotally connected at its lower end to said cross shaft, and means for latching the upper end of said tail gate unit to said side members, a locking element fixed with respect to each of said side members and projecting forwardly from the bottom thereof beneath the bottom of said truck body, a pair of locking devices carried by the truck body and movable into cooperative relation with said locking elements for locking the bottom of said tail gate assembly relative to the truck body, and an elongated lever fixedly connected to said locking devices and extending generally forwardly a substantial distance and terminating in a free end, said chassis frame having a cam block engageable with said free end of said lever when the truck body is lowered to a normal position from a dumping position for positively moving said locking devices into cooperative engagement with said locking elements.

4. A structure according to claim 3 wherein said lever is fixed at its other end to said rock shaft, and a normally fixed finger engageable with said free end of said lever when said truck body is moved to dumping position for positively rocking said rock shaft to disengage said locking devices from said locking elements.

5. A structure according to claim 4 wherein said normally stationary finger is constructed to be moved out of the path of travel of said other end of said lever, and means for supporting said other end of said lever relative to the truck body when said finger is swung out of the path of travel of said other end of said lever whereby said truck body may be moved to dumping position without releasing said locking devices from said locking elements, and whereby said means for latching the upper end of said tail gate unit to said side members may be released.

6. In combination with a truck body having a bed and side walls and an open rear end, a pair of spaced supporting frame members fixed to said bed, and a pair of spaced chassis frame members beneath the respective supporting frame members, a tail gate assembly normally closing said open end of the truck body and pivoted at its upper end with respect thereto, a locking element carried by each end of the bottom of said tail gate assembly outwardly of said frame members and projecting forwardly from said tail gate assembly beneath said tail gate assembly and beneath said truck bed, a horizontal rock shaft journaled in said supporting frame members, a pair of locking devices fixed to said rock shaft and each engageable with one of said locking elements, a forwardly projecting lever arm fixed at its rear end to said rock shaft, and a cam block carried by one of said chassis frame members and engageable with the other end of said lever arm when said truck body is moved downwardly to normal position for rocking said rock shaft and positively engaging said locking devices with said locking elements.

7. The combination defined in claim 6 provided with a finger carried by said one chassis frame member in the path of travel of said other end of said lever arm and engageable therewith when the truck body is moved upwardly from normal position to positively rock said rock shaft and positively disengage said locking devices from said locking elements.

References Cited by the Examiner

UNITED STATES PATENTS

| 1,456,630 | 5/1923 | Eaton. | |
| 1,588,110 | 6/1926 | Hughes | 296—51 |
| 1,735,408 | 11/1929 | Nein | 296—51 |
| 1,743,094 | 1/1930 | Barrett | 298—38 |
| 2,342,939 | 2/1944 | Hutchinson | 298—38 X |
| 3,072,438 | 1/1963 | Livingston et al. | 298—38 X |

FOREIGN PATENTS 535,565 2/1923 France.

BENJAMIN HERSH, *Primary Examiner.*
ARTHUR L. LA POINT, *Examiner.*